(12) United States Patent
Kearney-Fischer et al.

(10) Patent No.: US 7,834,483 B2
(45) Date of Patent: Nov. 16, 2010

(54) ENERGY HARVESTING SYSTEM AND METHOD USING MULTIPLE ENERGY SOURCES

(75) Inventors: Martin A. Kearney-Fischer, Spokane, WA (US); Payton J. Thompson, Bothell, WA (US)

(73) Assignee: The Boeing Company, Chicago, IL (US)

( * ) Notice: Subject to any disclaimer, the term of this patent is extended or adjusted under 35 U.S.C. 154(b) by 317 days.

(21) Appl. No.: 11/865,325

(22) Filed: Oct. 1, 2007

(65) Prior Publication Data

US 2009/0085409 A1    Apr. 2, 2009

(51) Int. Cl.
*H01H 89/00* (2006.01)
*H02J 3/00* (2006.01)

(52) U.S. Cl. .................. 307/115; 307/74; 307/76; 307/84; 307/85; 307/113

(58) Field of Classification Search ............ 307/72, 307/74, 75, 76, 84, 85, 113, 115
See application file for complete search history.

(56) References Cited

U.S. PATENT DOCUMENTS

| | | | |
|---|---|---|---|
| 6,236,143 B1 | 5/2001 | Lesieutre et al. | |
| 6,265,810 B1 | 7/2001 | Ngo | |
| 6,307,301 B1 | 10/2001 | Ngo et al. | |
| 6,320,280 B1 | 11/2001 | Kanesaka | |
| 6,320,707 B1 | 11/2001 | Khoshnevisan et al. | |
| 6,563,250 B2 | 5/2003 | Mathur | |
| 6,858,970 B2 | 2/2005 | Malkin et al. | |
| 6,894,460 B2 | 5/2005 | Clingman | |
| 7,249,805 B2 | 7/2007 | Cap | |
| 7,274,577 B2 * | 9/2007 | Utsunomiya | 363/59 |
| 7,508,248 B2 * | 3/2009 | Yoshida | 327/365 |

(Continued)

FOREIGN PATENT DOCUMENTS

WO    WO 02/086981    10/2002

OTHER PUBLICATIONS

Barrett, Ron. "Post-Buckled Precompressed (PBP) Actuators: Enhancing VTOL Autonomous High Speed MAVs" 46th AIAA/ASME/ASCE/AHS/ASC Structures, Structural Dynamics & Materials Conference Apr. 18-21, 2005, Austin, Texas.

(Continued)

*Primary Examiner*—Jared J Fureman
*Assistant Examiner*—Hal I Kaplan
(74) *Attorney, Agent, or Firm*—Harness, Dickey & Pierce, P.L.C.

(57) ABSTRACT

An energy harvesting system and method having improved efficiency. A primary energy harvesting device is used to generate a first electrical output signal. The first electrical output signal is applied to a first switching circuit. A secondary energy harvesting device is used to generate a second electrical output signal that is used to power a second switching circuit. The second switching circuit generates the switching drive signal for the first switching circuit, which in turn generates a final output signal. By using a second energy harvesting circuit operating in connection with a different structure, and a secondary switching circuit, less power from the signal generated by the primary energy harvesting device is needed to power the first switching circuit. This results in a greater percentage of the output power of the first signal being usable by an external device.

16 Claims, 2 Drawing Sheets

U.S. PATENT DOCUMENTS

| | | | |
|---|---|---|---|
| 7,528,502 B2 * | 5/2009 | Maeda | 307/46 |
| 2007/0096564 A1 | 5/2007 | Maeda | |
| 2008/0203823 A1 | 8/2008 | Deppe et al. | |

OTHER PUBLICATIONS

Mockensturm, Eric M. et al. "Active Structures Using Buckling Beam Actuators", 44th AIAA/ASME/ASCE/AHS Structures, Structural Dynamics, and Materials Conference; Apr. 7-10, 2003, Norfolk, Virginia.

Nguyen, Quoc Viet et al. "Improvement of actuation displacement of LIPCA implementing bifurcation phenomena", Structures and Materials 2006; Active Materials: Behavior and Mechanics, edited by William D. Armstrong, Proc. of SPIE vol. 6170, 6170L, (2006).

Lesieutre, George A. et al. "Can a Coupling Coefficient of a Piezoelectric Device Be Higher Than Those of Its Active Material?" reprinted from Journal of Intelligent Material Systems and Structures, vol. 8—Oct. 1997.

Qiu, Jin et al. "A Centrally-Clamped Parallel-Beam Bistable MEMS Mechanism" 0-7803-5998-4/1/$10.00©2001IEEE.

Qiu, Jin. "A Curved-Beam Bistable Mechanism", 1057-7157/04$20.00 copyright 2004IEEE.

* cited by examiner

ENERGY HARVESTING SYSTEM AND METHOD USING MULTIPLE ENERGY SOURCES

FIELD

The present disclosure relates to energy harvesting systems and methods, and more particularly to an energy harvesting system and method that harvests energy from a primary source and at least one secondary source, and uses the energy harvested from the secondary source to assist in powering circuitry used to generate an output signal from the output of the primary source, to thus effectively increase the efficiency of the output from the primary energy harvesting source.

BACKGROUND

The statements in this section merely provide background information related to the present disclosure and may not constitute prior art.

In previously developed energy harvesting systems, an electrical output signal from an energy harvesting device or component is often used to power the components of electrical circuitry that generate a useable (typically an oscillating) output signal. The useable output signal may then be used for various purposes, such as to power other devices requiring electrical power for their operation.

In some instances the electrical circuitry used to receive the output from the energy harvesting device involves one or more metal oxide silicon field effect transistors (MOSFETs) or other similar, semiconductor switching devices. Such switching devices require a certain forward bias voltage to be switched on. This arrangement has significant drawbacks from an efficiency standpoint. This is because a significant percentage of the output from the energy harvesting device must often be used as the biasing current to turn on and off the semiconductor switching devices. This portion of the output from the energy harvesting device is thus effectively "lost" and the output power available from the system is reduced accordingly. Put differently, the need to use a portion of the output from the energy harvesting device to power various electrical switching components (i.e., components that are needed to produce a useable electrical output signal), reduces the overall efficiency of the energy harvesting system.

In many applications, there is more than one available source of energy, which might be termed a "secondary" source of energy, that can be harvested. However, the secondary energy source, standing alone, might not yield sufficient electrical power for the specific application that energy harvesting is contemplated for, and therefore no attempt is made to harvest the small amount of energy from the secondary source.

SUMMARY

A system and method for harvesting energy is disclosed. In one embodiment a primary energy harvesting device is used to harvest energy from a structure and to generate a first electrical output signal. The first electrical output signal is applied to a first switching circuit. A secondary energy harvesting device harvests energy from the same or a different structure and generates a second electrical output signal that is used to power the first switching circuit. In this manner, power from the first electrical output signal is not required for use in powering the electrical components of the first switching circuit, thus leaving a greater percentage of the power harvested by the primary energy harvesting device available for use by an external device. Overall system efficiency is increased because the secondary energy harvester harvests energy, which would otherwise not be used by previously developed systems, to power the first switching circuit.

In one embodiment a second switching circuit is included for receiving the second electrical output signal and generating an electrical signal that is used to drive the first switching circuit. A wide variety of different forms of energy harvesting devices may be used for each of the primary and secondary energy harvesting devices. In one specific embodiment, the first energy harvesting device may form a thermoelectric device, while the primary switching circuit includes a mechanical switch driven by vibration. The mechanical switch may be located on structure operably associated with, or independent of, that structure that the thermoelectric device is located on. The secondary energy harvesting device may form one or more of a photodetector, a strain gauge, a piezoelectric device, or any other form of energy harvesting component. The second switching circuit may include a semiconductor device, for example a metal oxide silicon field effect transistor (MOSFET) or a micro-electro-mechanical systems (MEMS) device acting as a switch, or any other form of mechanical switch that is subject to vibration.

In the various described embodiments, the secondary energy harvesting device is used to generate an electrical signal that is used to power the first switching circuit, and thus allows the majority of the electrical signal generated by the first energy harvesting device to be used for an external device, rather than for powering the first switching circuit.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
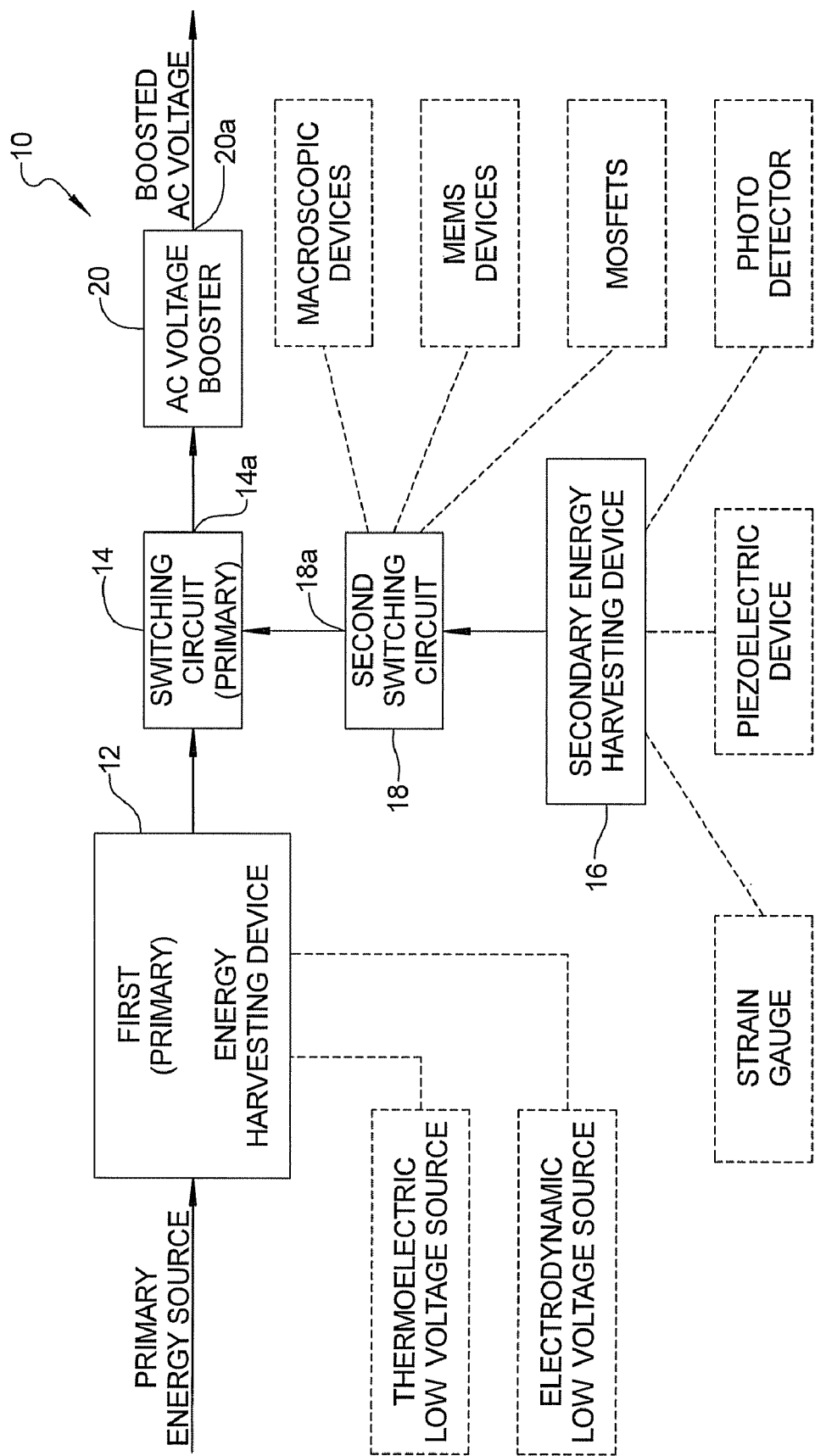
FIG. 1 is a simplified block diagram of one embodiment of the system of the present disclosure.

Referring to FIG. 1, there is shown an energy harvesting system 10 in accordance with one exemplary embodiment of the present disclosure. The system 10 includes a primary (or first) energy harvesting device or system 12, a first switching circuit 14, a secondary (or second) energy harvesting device or system 16, and a second switching circuit 18.

The primary energy harvesting device 12, in one exemplary embodiment, may be formed by a thermoelectric device that harvests thermal energy from an external device or system and generates a first electrical output signal. Of course, any suitable energy harvesting device or component, for example an electrodynamic transducer, a photodetector, a piezoelectric device, or a strain gauge, just to name a few, may be used as the primary energy harvesting device 12. The specific type of energy harvesting device used will depend on the nature of the component/system from which energy is to be harvested.

The first electrical signal from the primary energy harvesting device 12 is output to the input of a first switching circuit 14. The first switching circuit 14 generates an electrical output signal at output 14a thereof that is typically an oscillating electrical signal, for example essentially an alternating current (AC) signal or possibly an oscillating direct current (DC) signal. However, the signal generated could also be a non-oscillating signal, and therefore both oscillating and non-oscillating output signals are possible.

The first switching circuit 14, in one embodiment, is comprised of a mechanical switch, but it may alternatively comprise a MEMS switch, a MOSFET or any other type of switch. Similarly, the second switching circuit 18 may also comprise a MEMS switch, a MOSFET or other form of macroscopic device. Such other forms of macroscopic devices might include inverting circuits, tuned resonance circuits, or any other system or device for achieving DC to AC signal inversion.

The secondary energy harvesting device 16 may also comprise virtually any type of energy harvesting device, but in various embodiments comprises one of a strain gauge, a piezoelectric device or a photodetector. The secondary energy harvesting device may be used to harvest energy from a source, for example a vibrating structure, that would not be expected to produce a sufficiently high magnitude electrical signal for the purpose for which the primary energy harvesting device is being used. However, the electrical signal generated by the secondary energy harvesting device 16 may still be sufficiently strong to be used to drive an external switching circuit or device, and thus enable a higher percentage of the first electrical signal generated by the primary energy harvesting device 12 to be used with an external device.

The output from the secondary energy harvesting device 16 forms a second electrical output signal that may be fed to an input of the second switching circuit 18, which in turn uses this electrical signal to generate a switching signal at its output 18a. The second switching circuit 18 could similarly comprise a MEMS switch, MOSFET, tuned resonance circuit, or possibly any form of DC to AC inversion device or system.

The switching signal from output 18a is used to drive the electrical component(s) of the first switching circuit 14. This forms a significant advantage from an efficiency standpoint. Because a portion of the first electrical signal is not required to be used to drive the electrical switching component(s) of the first switching system 14, a greater percentage of the first electrical output signal can be used to power or control an external device. Put differently, the power efficiency of the primary energy harvesting device 12 is significantly improved by not requiring a portion of its first electrical output signal to be used to power the component(s) of the first switching circuit 14.

Referring further to FIG. 1, the final electrical signal transmitted from the output 14a of the first switching circuit 14 may be fed into an AC voltage booster circuit 20, which may be formed by a step-up transformer or other form of amplifier circuit, such as a cascaded diode amplifier. One specific type of cascaded diode amplifier that may be suitable for use is the well known Cockroft-Walton multiplier. Accordingly, an amplified final output signal is generated at output 20a of the AC voltage booster 20. The amplified final output signal may be applied directly to an external device or to an intermediate component associated with the external device, but in either event is used to control, drive or power the external device.

Figure 2:
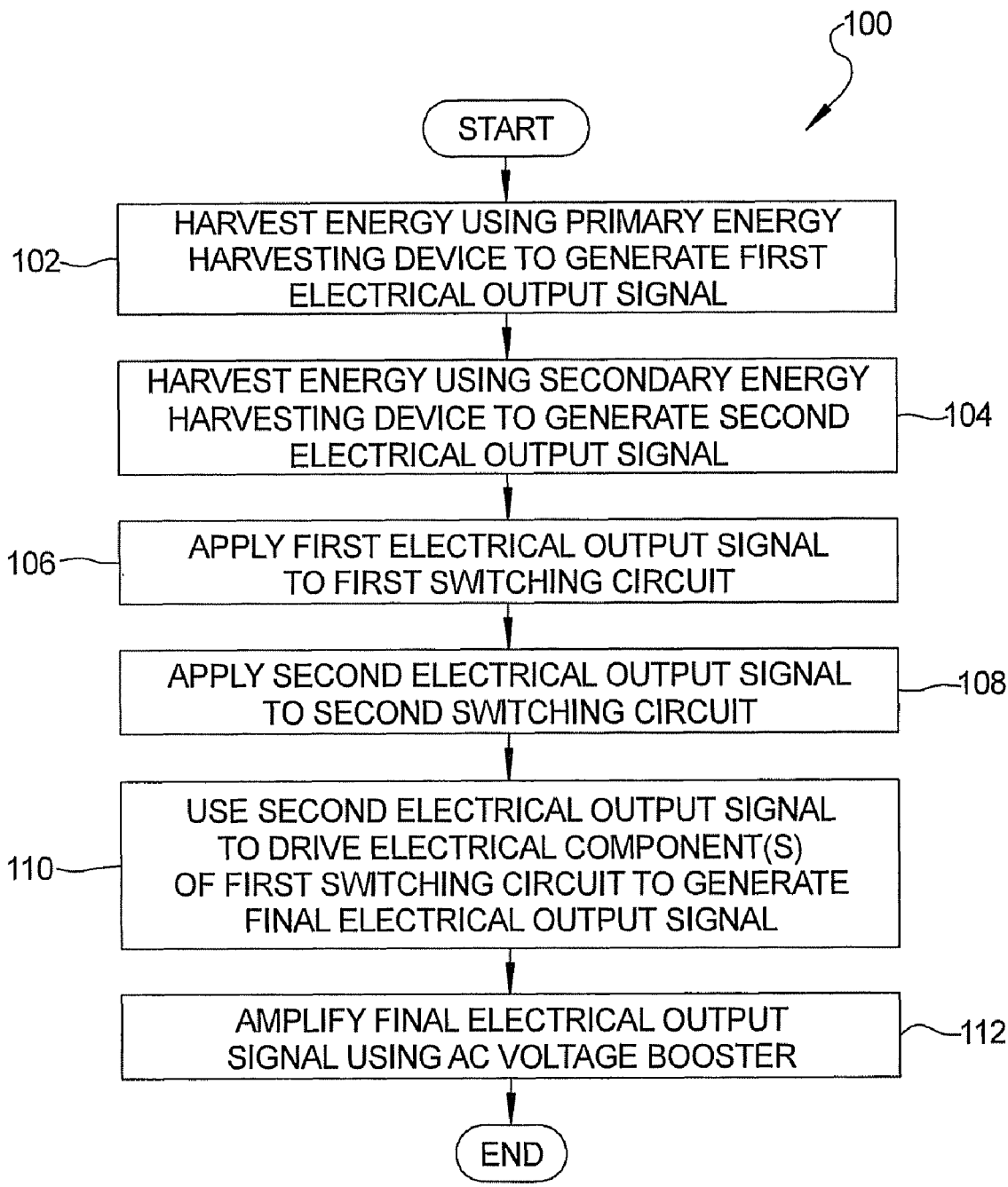
FIG. 2 is a flowchart of major operations performed by the system of the present disclosure.

Referring to FIG. 2, a flowchart 100 is shown of the major operations that may be performed in accordance with operation of the system 10. At operation 102, energy is harvested using the primary energy harvesting device 12, and a first electrical output signal is generated. At operation 104, energy is harvested using the secondary energy harvesting device 16, and a second electrical output signal is generated. At operation 106 the first electrical output signal is applied to the first switching circuit 14. At operation 108 the second electrical output signal is applied to the second switching circuit 18. At operation 110 the output of the second switching circuit 18 is used to drive the electrical component(s) of the first switching circuit 14 to create a final electrical output signal of a typically AC nature having an oscillating characteristic. At operation 112 the final electrical output signal is amplified using the AC voltage booster 20.

It will be appreciated that while only a single, first energy harvesting device 12 is illustrated, that more than one such energy harvester may be employed to generate electrical signals that are summed to produce the first electrical output signal. Similarly, while only a single, second energy harvesting device 16 is shown, that more than one such secondary energy harvesting device could be employed and the output signals from each summed to produce the second electrical output signal. The primary and secondary energy harvesting devices 12 and 16 may be located on the same or different physical structures, and may further be designed to harvest different types of energy (e.g., vibration energy, optical energy, thermal energy, etc.).

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. An energy harvesting system comprising:
    a primary energy harvesting device for generating a first electrical output signal from energy harvested from a first energy source;
    a secondary energy harvesting device for generating a second electrical output signal;
    a primary switching circuit adapted to be controlled by said second electrical output signal, and to receive said first electrical output signal, and to generate therefrom a final electrical output signal; and
    a secondary switching circuit interposed between said secondary energy harvesting device and said primary switching circuit, for receiving said second electrical output signal and generating therefrom a switched second electrical output signal for powering electrical components of said primary switching circuit.

2. The system of claim 1, wherein said primary energy harvesting device comprises a thermoelectric device, and said first energy source comprises a thermoelectric energy source.

3. The system of claim 1, wherein said secondary switching circuit comprises a micro-electro-mechanical system (MEMS) switching component.

4. The system of claim 1, wherein said secondary switching circuit comprises a metal oxide semiconductor field effect transistor (MOSFET).

5. The system of claim 1, wherein said secondary energy harvesting device comprises a strain gauge.

6. The system of claim 1, wherein said secondary energy harvesting device comprises a piezoelectric device.

7. The system of claim 1, wherein said secondary energy harvesting device comprises a photodetector.

8. The system of claim 1, further comprising an amplifier for amplifying an output from said primary switching circuit.

9. An energy harvesting system comprising:
   a primary energy harvesting device for generating a first electrical output signal from energy harvested from a first energy source;
   a secondary energy harvesting device for generating a second electrical output signal;
   a primary switching circuit adapted to receive said first electrical output signal and to generate therefrom a final electrical output signal; and
   a secondary switching device interposed between an output of said secondary energy harvesting device and an input of said primary switching circuit, and being responsive to said secondary energy harvesting device, and adapted to generate a second electrical signal for powering electrical components of said primary switching circuit.

10. The system of claim 9, wherein said primary energy harvesting device comprises a thermoelectric device, and said first energy source comprises a thermoelectric energy source.

11. The system of claim 9, wherein said secondary switching device comprises a micro-electro-mechanical system (MEMS) switching component.

12. The system of claim 9, wherein said secondary switching device comprises a metal oxide semiconductor field effect transistor (MOSFET).

13. The system of claim 9, wherein said secondary energy harvesting device comprises a strain gauge.

14. The system of claim 9, wherein said secondary energy harvesting device comprises a piezoelectric device.

15. The system of claim 9, said secondary energy harvesting device comprises a photodetector.

16. A method for harvesting energy comprising:
   using a primary energy harvesting device to generate a first electrical output signal from energy harvested from a first energy source;
   using a secondary energy harvesting device for generating a second electrical output signal; and
   using a primary switching circuit adapted to be controlled by said second electrical output signal, and to receive said first electrical output signal, and to generate therefrom a final electrical output signal;
   amplifying said final electrical output signal; and
   using a secondary switching circuit interposed between said secondary energy harvesting device and said primary switching circuit, for receiving said second electrical output signal and generating therefrom a switched second electrical output signal for powering electrical components of said primary switching circuit.

* * * * *